United States Patent [19]

Simpson

[11] Patent Number: 5,742,149

[45] Date of Patent: Apr. 21, 1998

[54] ADAPTABLE BATTERY CHARGER SYSTEM

[75] Inventor: Russell L. Simpson, Miami, Fla.

[73] Assignee: Motorola, Inc., Schaumburg, Ill.

[21] Appl. No.: 868,328

[22] Filed: Jun. 3, 1997

[51] Int. Cl.$^6$ ................................................. H02J 7/00
[52] U.S. Cl. ............................ 320/113; 320/110; 320/112; 320/107
[58] Field of Search .................................. 320/110, 113, 320/112, 107; 429/98

[56] References Cited

U.S. PATENT DOCUMENTS 5,233,281   8/1993   Chiang et al. ........................ 320/110
5,280,229   1/1994   Faude et al. ......................... 320/110

*Primary Examiner*—Peter S. Wong
*Assistant Examiner*—K. Shin
*Attorney, Agent, or Firm*—Barbara R. Doutre

[57] ABSTRACT

A charging system (100) includes a charger unit (102) having a charge pocket (110) within which a plurality of replaceable pockets (104, 106, 108) can be inserted to charge various battery types and various battery configurations. The replaceable pockets (104, 106, 108) each contain a memory chip (112) for storing battery parameter information. The charger unit (102) charges the battery (302) based on the battery parameter information stored in the memory chip (112) of the replaceable pockets (104, 106, 108).

6 Claims, 3 Drawing Sheets

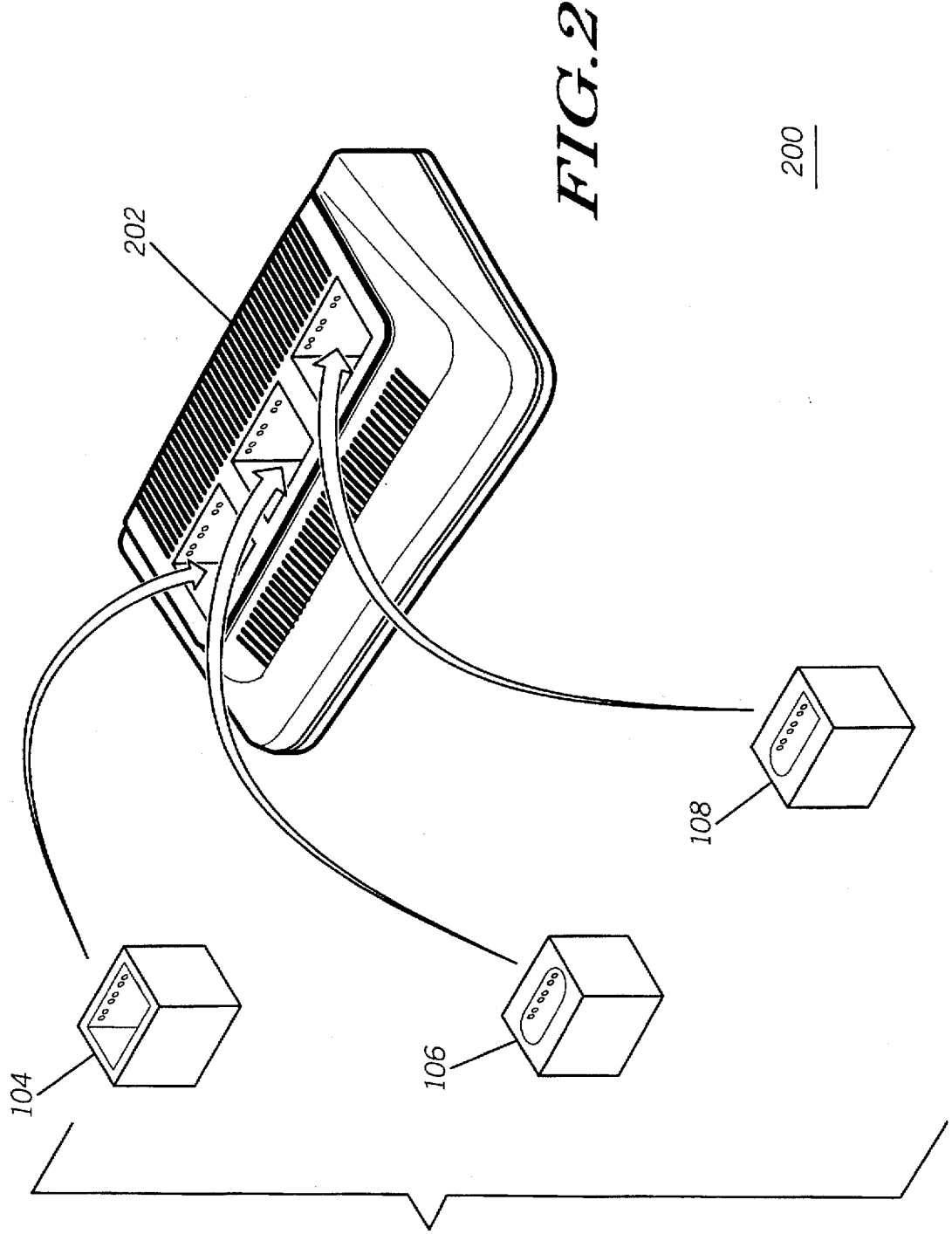

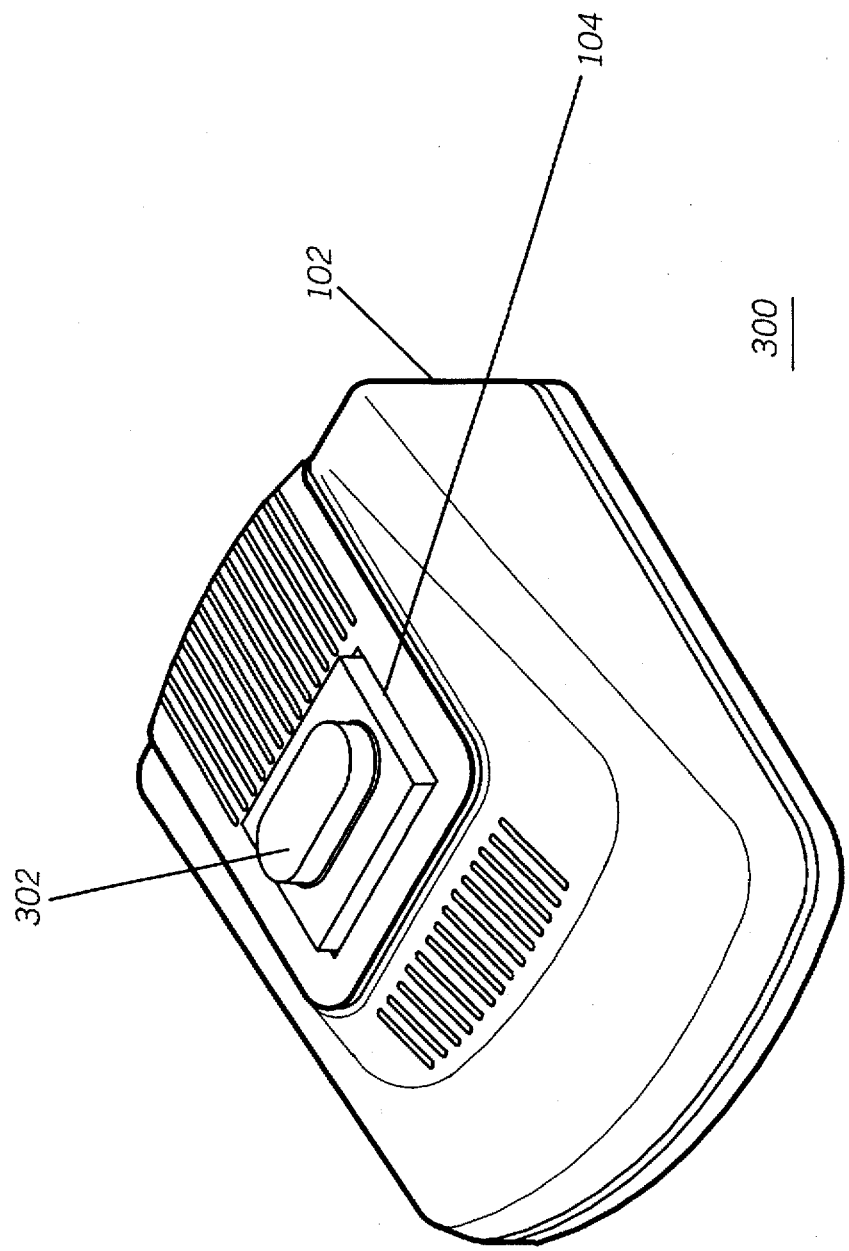

ADAPTABLE BATTERY CHARGER SYSTEM

TECHNICAL FIELD

This invention relates in general to battery chargers and more specifically to battery chargers adapted for various battery types.

BACKGROUND

Today's portable radios are powered from a variety of battery types. These batteries can vary in terms of battery parameters such as capacity, chemistry, rated charge current, temperature cutoff, and voltage cutoff. Typically, a different battery charger is used for each radio product, not just because of the size and shape of the radio, but because of the variation in the battery parameter. Several universal charging schemes have been tried in the past, but have met with limited success. For example, substitute charger pockets have been adapted to fit within a main charger unit to accommodate various battery shapes but because of overlapping code resistor values and limitations of the main charging unit, these pockets have generally proven unsuccessful at adapting to new battery types.

Accordingly, there is a need for an improved battery charging system which can charge many different types of batteries for various radio models.

BRIEF DESCRIPTION OF THE DRAWINGS

FIG. 2 shows the replaceable pockets of FIG. 1 in conjunction with a multi-unit charger in accordance with the present invention.

FIG. 3 shows a battery inserted into a replaceable pocket of the present invention with the pocket inserted into the charger unit.

DETAILED DESCRIPTION OF THE PREFERRED EMBODIMENT

Figure 1:
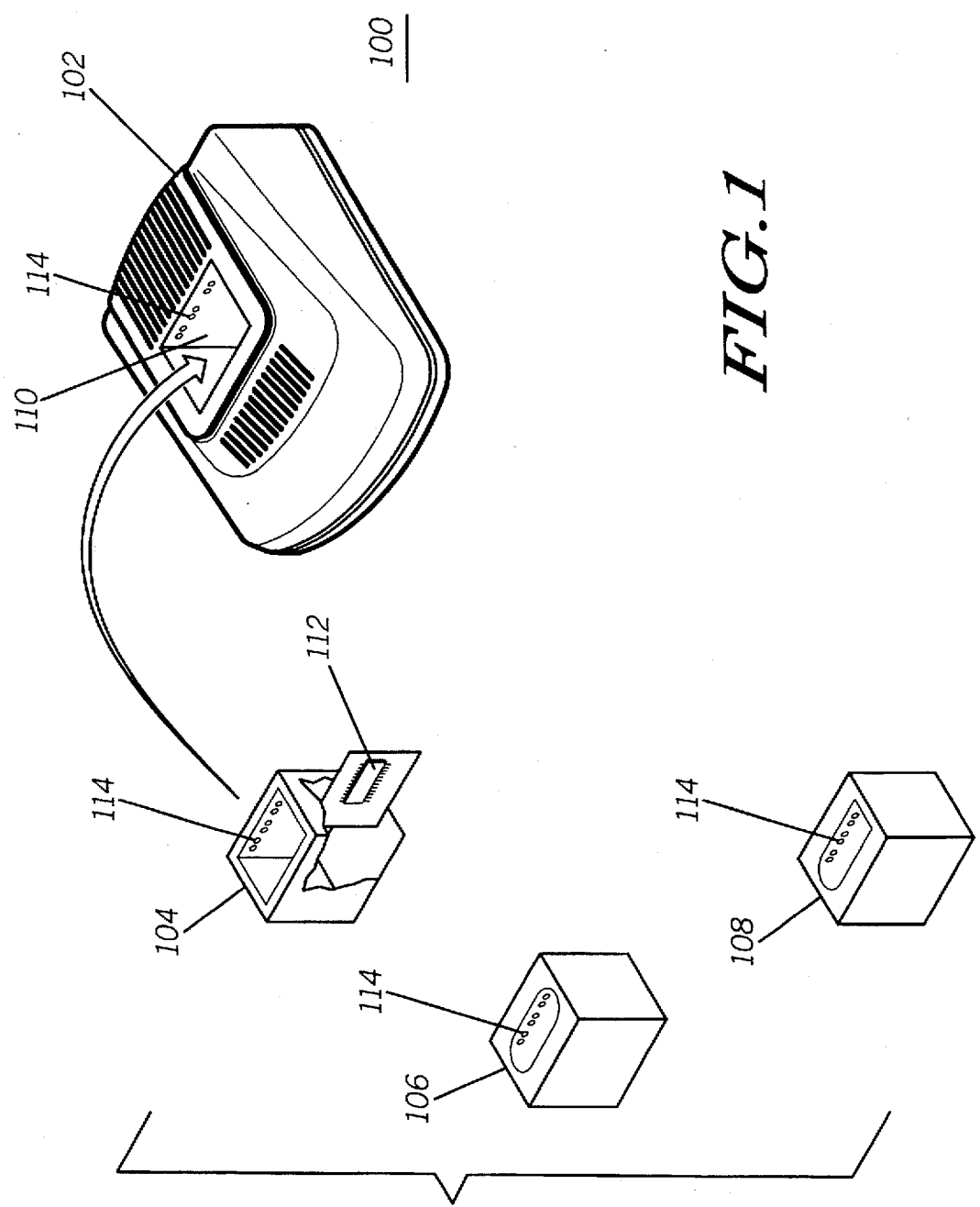
FIG. 1 is a battery charging system in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a battery charging system 100 in accordance with the present invention. In accordance with the present invention, the battery charging system 100 comprises a main charger unit 102 having a charging pocket 110 for receiving a replaceable pocket from a plurality of replaceable pockets 104, 106, and 108, wherein each replaceable pocket includes a memory portion 112. Further in accordance with the present invention, each replaceable pocket 104, 106, and 108 includes the memory portion 112 for identifying predetermined battery parameters of a particular battery or family of batteries such as capacity, chemistry, rated charge current, temperature cutoff, and voltage cutoff. Memory portion 112 is preferably a memory chip such as an erasable programmable read only memory (EPROM). The replaceable pockets 104, 106, and 108 are shown with a variety of insert shapes to accommodate different shaped batteries used in different radio products. Charging unit 102 includes a plurality of interface contacts 114 which mate with corresponding contacts 116 found within each of the plurality of replaceable pockets 104, 106, and 108. Interface contacts 114 include supply voltage (B+), ground (B−), code resistor interconnects, and a data line and control line. The data line and the control line interconnects are used to download charging parameters, such as capacity, chemistry, rated charge current, temperature cutoff, and voltage cutoff to the microprocessor of the main charging unit 102. By including the memory chip 112 in each replaceable pocket, a single main charging unit 102 can be used for a plurality of battery types and configurations.

Referring now to FIG. 2, the replaceable pockets 104, 106, 108 are shown in conjunction with a multi-unit charger configuration 200 in accordance with the present invention. The replaceable pockets 104, 106, 108 of the present invention appreciably expand the charging capabilities of the multi-unit charger 202 in that different battery types for different radio products can now be charged at the same time from a single base unit. Again, the microprocessor (not shown) is contained within the multi-unit charger 202 which controls the charging of the different battery types based on the information downloaded by the memory chip 112 of the replaceable pockets 104, 106, 108 of the present invention.

FIG. 3 shows a battery 302 inserted into one of the replaceable pockets 104 of the present invention with the pocket 104 inserted into the charger unit 102.

Accordingly, there has been provided a replaceable pocket having a memory chip for storing battery parameter information which extends the charging capability of both single unit and multi-unit chargers. A single charger base can now be used to accommodate various radio products and various battery types providing the advantage of commonality for the manufacturer and the user.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

I claim:

1. A battery charging system, comprising: a charger unit; and a replaceable pocket insertable into the charger unit, the replaceable pocket having a memory chip for storing battery parameter information, the charger unit charging a battery based on the battery parameter information stored in the memory chip of the replaceable pocket.

2. A battery charging system as described in claim 1, wherein the charging unit comprises a multi-unit charger.

3. A battery charging system as described in claim 1, wherein the charging unit comprises a single unit charger.

4. A battery charging system, comprising: a charger unit having a charge pocket with interface contacts; a replaceable pocket insertable into the charge pocket of the charger unit, the replaceable pocket comprising: interface contacts corresponding with the interface contacts of the charger unit; and a memory portion for storing predetermined battery parameter information, the memory portion downloading the predetermined battery parameter information to the charger unit when the replaceable pocket is inserted into the charge pocket of the charger.

5. A battery charging system as described in claim 4, wherein the charger is a multi-unit charger having a plurality of charge pockets for receiving a plurality of replaceable pockets.

6. A battery charger, comprising: a charge pocket; interface contacts within the charge pocket; a replaceable pocket insertable into the charge pocket, the replaceable pocket for receiving a battery, the replaceable pocket including interface contacts for mating with the interface contacts of the charge pocket and also for mating with corresponding battery contacts of the battery, the replaceable pocket including a memory chip for storing battery parameter information, the battery parameter information being downloaded to the charger unit and the charger unit charging the battery based on the battery parameter information.

\* \* \* \* \*